US008910118B2

(12) United States Patent
He et al.

(10) Patent No.: US 8,910,118 B2
(45) Date of Patent: Dec. 9, 2014

(54) EXTRACTING BUSINESS RULES OF A SERVICE-ORIENTED ARCHITECTURE (SOA) SYSTEM

(75) Inventors: Lei He, Haidian District (CN); Xin Peng Liu, Beijing (CN); Xue Wang, Beijing (CA); Yue Wang, Beijing (CN); Wei Qing Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 13/617,086

(22) Filed: Sep. 14, 2012

(65) Prior Publication Data

US 2013/0080998 A1 Mar. 28, 2013

(30) Foreign Application Priority Data

Sep. 27, 2011 (CN) .......................... 2011 1 0295467

(51) Int. Cl.
*G06F 9/44* (2006.01)
*G06Q 10/06* (2012.01)
(52) U.S. Cl.
CPC .................................... *G06Q 10/06* (2013.01)
USPC ......................................... 717/123; 717/120
(58) Field of Classification Search
CPC ....................................................... G06F 8/73
USPC .......................................................... 717/123
See application file for complete search history.

(56) References Cited

U.S. PATENT DOCUMENTS

| 6,847,981 | B2 | 1/2005 | Song et al. |
| 7,316,008 | B1 | 1/2008 | Dutta |
| 8,413,107 | B2 * | 4/2013 | Brininstool et al. .......... 717/104 |
| 2003/0083900 | A1 | 5/2003 | Khriss et al. |
| 2004/0220910 | A1 * | 11/2004 | Zang et al. ........................ 707/3 |
| 2007/0050364 | A1 * | 3/2007 | Cummins ........................ 707/9 |
| 2008/0167928 | A1 * | 7/2008 | Cao et al. .......................... 705/8 |
| 2008/0168096 | A1 | 7/2008 | Daskal et al. |
| 2010/0017783 | A1 * | 1/2010 | Brininstool et al. .......... 717/101 |

FOREIGN PATENT DOCUMENTS

WO            0179996          10/2001

OTHER PUBLICATIONS

Jose L. Martinez-Fernandez et al., "A Preliminary Approach to the Automatic Extraction of Business Rules from Unrestricted Text in the Banking Industry," E. Kapetanios, V. Sugumaran, M. Spiliopoulou (Eds.): NLDB 2008, LNCS 5039, pp. 299-310, 2008 © Springer-Verlag Berlin Heidelberg 2008.
Xinyu Wang et al., Business Rules Extraction from Large Legacy Systems, CSMR '04 Proceedings of the Eighth Euromicro Working Conference on Software Maintenance and Reengineering (CSMR '04), p. 249, IEEE Somputer Society, Washington, DC USA, 2004.

* cited by examiner

*Primary Examiner* — Phillip H Nguyen
(74) *Attorney, Agent, or Firm* — Yudell Isidore PLLC; Parashos Kalaitzis

(57) ABSTRACT

The present disclosure discloses a method, system, and computer program product for extracting business rules of a Service-Oriented Architecture (SOA) system. Each of the method, system, and computer program product providing functions comprising: obtaining values of a plurality of business objects; obtaining structure units of the SOA system; establishing association relationships between the structure units and the values of the business objects; and generating business rules based on the association relationships. Using one or more embodiments of the present disclosure can break through the limitations of the conventional method of extracting business rules of a SOA system based on code, and can extract business rules of a complex SOA system.

15 Claims, 3 Drawing Sheets

EXTRACTING BUSINESS RULES OF A SERVICE-ORIENTED ARCHITECTURE (SOA) SYSTEM

PRIORITY CLAIM

The present application claims benefit of priority under 35 USC §120 and §365 to the previously filed Chinese Patent Application No. 201110295467.X titled, "Extracting Business Rules of a Service-Oriented Architecture (SOA) System" with a priority date of Sep. 27, 2011. The content of that application is incorporated by reference herein.

TECHNICAL FIELD

The present disclosure relates to computer-implemented Service-Oriented Architecture (SOA), and in particular, to a method and system for extracting business rules of computer-implemented SOA.

DESCRIPTION OF THE RELATED ART

The Service-Oriented Architecture (SOA) system is a service model, which uses interfaces well defined in a neutral manner to interconnect different functional units of applications. Functional units are also referred to as services or service components in the SOA for short. A system constructed based on the SOA is generally referred to as a SOA system. Since interface definitions are independent of the hardware platform, operating system and programming language implementing services, services in various SOA systems can interact with each other in a uniform and generic manner. For ease of understanding, the meanings of various terms are explained briefly below.

A service refers to a distributed accessible module with certain reusable functions encapsulated through good interface definitions, whose accessible module corresponds to a functional unit of an application. A service usually has a generic interface description language, and can perform message interactions using a common protocol.

An interaction among services refers to a message interaction among services performed through a common protocol, so as to access logics encapsulated internally through the respective interfaces.

A business object refers to a data object transferred in a message interaction performed using a common protocol among services, usually described in the extended markup language (XML) format to satisfy the cross-platform feature.

A business rule refers to an inherent rule complied with in accessing through defined interaction relationships among member services of a SOA system. A business rule can be formalized as a function-like description, f(x, y, z), wherein the parameters of the function are the conditions of the business rule, which generally comprise: content patterns of the data object transferred in the interaction; structural association relationships of the SOA system in which the service transferring the business object resides. The function value is an action of the business rule, i.e., an action of interaction performed between the services when the conditions are met, and actions generally comprise conversion of the data format of the transferred data object, and the transferring direction of the data object.

A structure unit refers to a service container in a SOA, containing a set of one or more services structurally interconnected, as well as common infrastructure such as security, transactionality, etc. required for performing their functions by these services, for example, an ESB, a flow and a gateway, etc. The services constituting a structure unit can have interaction relationships thereamong or be independent of one another, but all belong to the same structure unit.

An enterprise service bus (ESB) is an infrastructural module of combining the conventional middleware technology and such technologies as XML, Web Service, etc. ESB provides the most basic connection backbone in the service interaction network formed by the member services of a SOA system, and its basic functions are shielding the heterogeneity of service interactions in data formats and communication protocols, and realizing the transparent routing of interaction connections among services.

A mediator is a main internal module of ESB in the implementation level. ESB is generally formed by one or a set of interconnected mediators, which provide the most basic functions such as service data format conversion, protocol conversion and service routing, etc. A mediator generally has high cohesiveness, and a same mediator generally processes centrally some portion of data objects (i.e., sub-data objects) transferred by a set of services connected therewith.

A flow is a combination of a series of services in a particular call order, which represents the dependant relationships of these services in call timing. For example, if after service A is called, B is called, and then C is called, the dependant relationship in calling timing, A->B->C, which is an example flow.

A gateway refers to a device for providing protocol conversion, route selection, data exchange as well as compatibility and security control functions such as filtering in performing cross-subsystem service interactions by SOA subsystems located in different physical network segments or on distributed nodes.

Conventionally, business rules of a SOA system are extracted based on code. With SOA systems becoming more and more complex, there are more and more services forming a SOA system, often involving a vast amount of code, and the conventional method of extracting business rules of a SOA system based on code encounters a bottleneck when processing a complex SOA system. Also, in most cases, since a SOA system only exposes the interfaces of the services forming the system and metadata description of the structure units, the source code is not available, or the services forming the SOA system are deployed by a remote different organization. Consequently, the source code cannot be obtained by policy, and the conventional method of extracting business rules of a SOA system based on code cannot be used.

Illustrative embodiments of the present disclosure recognize the above disadvantages in the prior art.

SUMMARY

According to an embodiment of the present disclosure, there is provided a method for extracting business rules of a Service-Oriented Architecture (SOA) system. The method comprises: obtaining values of a plurality of business objects; obtaining structure units of the SOA system; establishing association relationships between the structure units and the values of the business objects; and generating business rules based on the association relationships.

According to an embodiment of the present disclosure, there is provided a system for extracting business rules of a SOA system. The system comprises: a monitoring module configured to obtain values of a plurality of business objects; an analysis module configured to obtain structure units of the SOA system; an association module configured to establish association relationships between the structure units and the values of the business objects; and a generation module configured to generate business rules based on the association relationships.

In addition, an embodiment of the present disclosure further provides a computer program product corresponding with the above method.

Using the one or more embodiments provided by embodiments of the present disclosure can break through the limitations of the conventional method of extracting business rules of a SOA system based on code and can extract business rules of a complex SOA system.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and are used to further illustrate, by way of example, embodiments of the present disclosure and explain principles and advantages of the present disclosure.

DETAILED DESCRIPTION OF AN ILLUSTRATIVE EMBODIMENT

Described herein is a method, system, and computer program product for extracting business rules of a Service-Oriented Architecture (SOA) system. Each of the method, system and computer program product comprises: obtaining values of a plurality of business objects; obtaining structure units of the SOA system; establishing association relationships between the structure units and the values of the business objects; and generating business rules based on the association relationships.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The corresponding structures, materials, acts, and equivalents of all means or step plus function elements in the claims below are intended to include any structure, material, or act for performing the function in combination with other claimed elements as specifically claimed. The description of embodiments of the present disclosure has been presented for purposes of illustration and description, but is not intended to be exhaustive or limited to the form disclosed. Many modifications and variations will be apparent to those of ordinary skill in the art. The embodiment was chosen and described in order to best explain the principles and the practical application, and to enable others of ordinary skill in the art to understand various embodiments of the disclosure with various modifications as are suited to the particular use contemplated.

Figure 1:
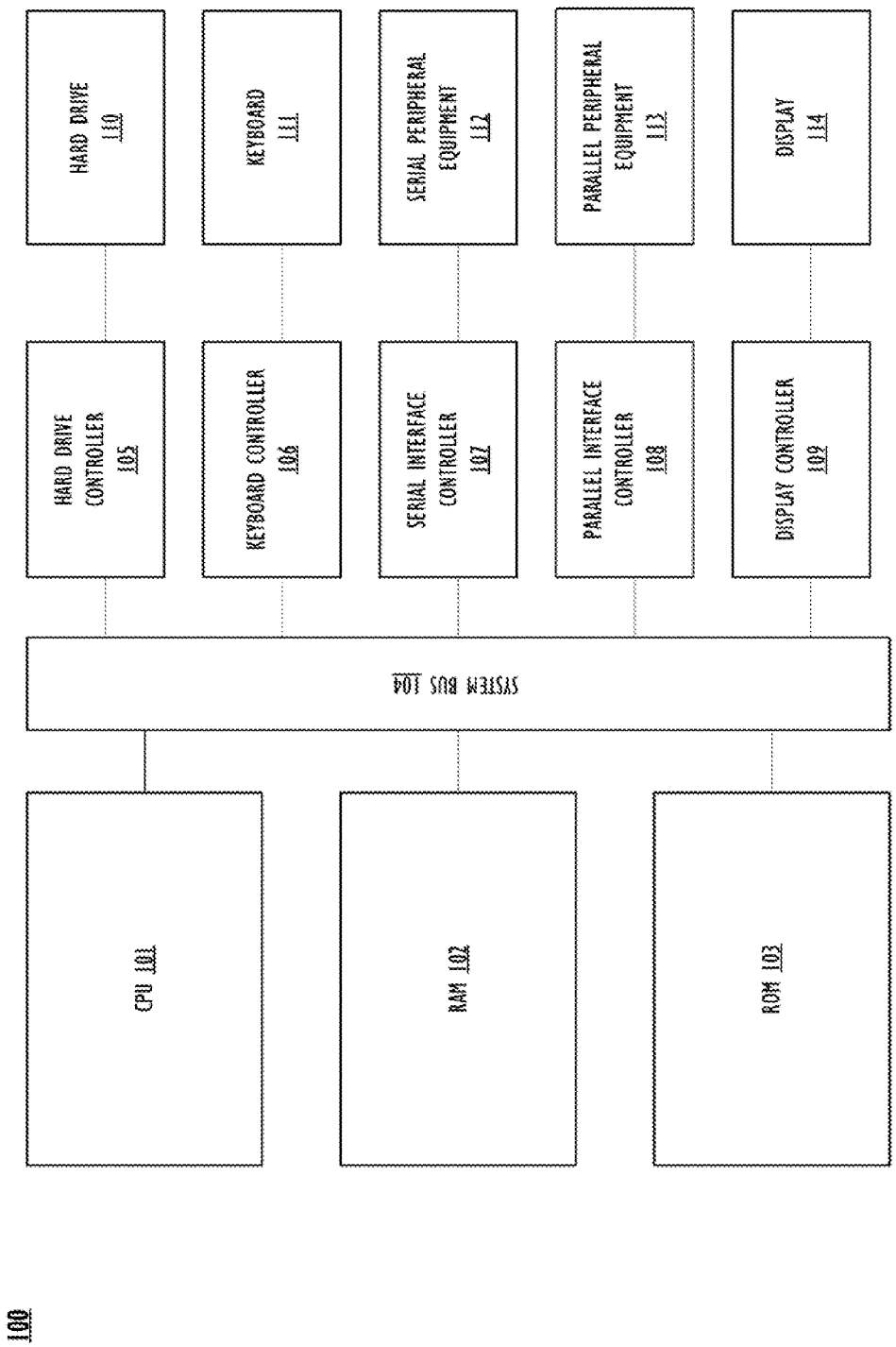
FIG. 1 illustrates a block diagram of an exemplary computing system suitable for realizing embodiments of the present disclosure.

FIG. 1 shows an exemplary computer system 100 which is applicable to implement the embodiments of the present disclosure. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113, and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

Figure 2:
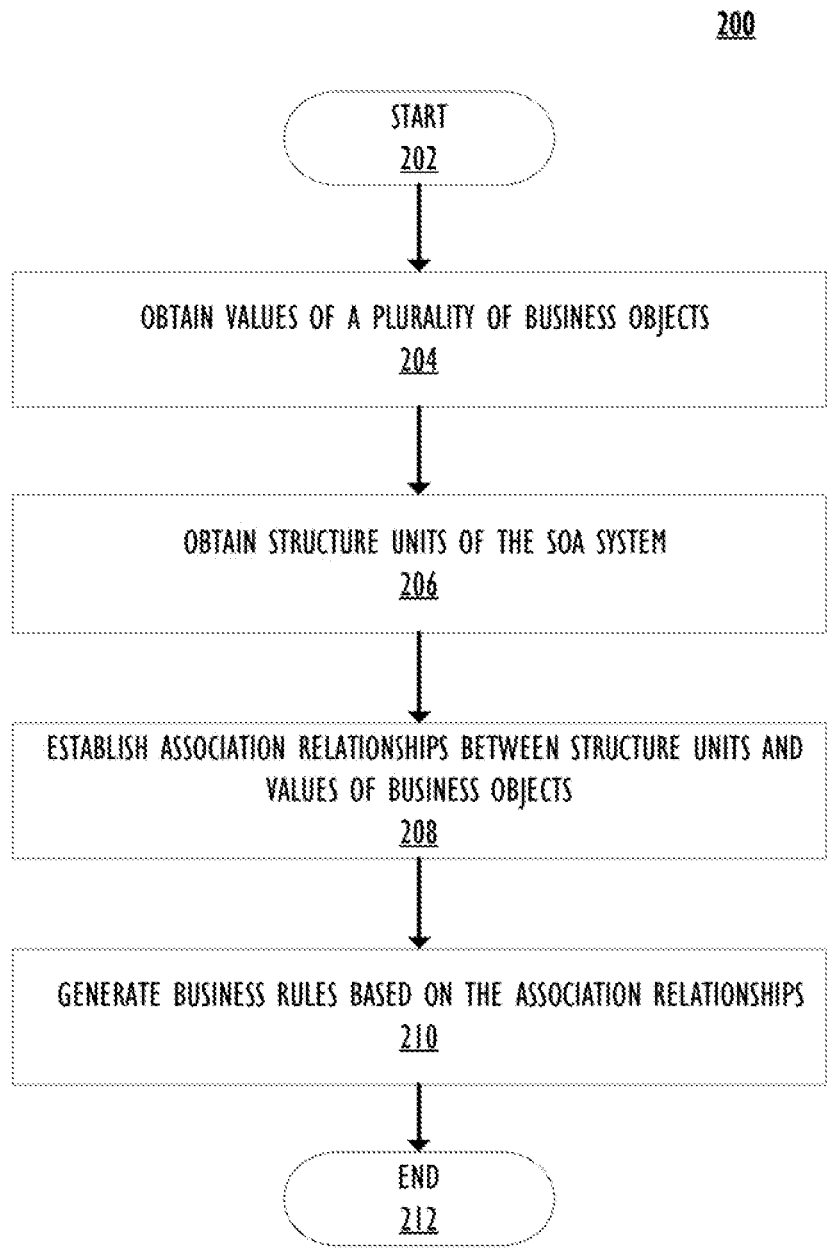
FIG. 2 illustrates a flow diagram of a method for extracting business rules of a SOA system according to an embodiment of the present disclosure.

FIG. 2 illustrates a flow diagram of a method 200 for extracting business rules of a SOA system according to an embodiment of the present disclosure. The method 200 for extracting business rules of a SOA system according to an embodiment of the present disclosure starts at step 202.

Next, method 200 proceeds to step 204, in which values of a plurality of business objects are obtained. According to an embodiment of the present disclosure, in order to obtain values of business objects involved in interactions among services in a SOA system, a series of runtime proxies need to be deployed in the SOA system. The runtime proxies can be deployed by injecting into a server runtime environment. Deploying runtime proxies belongs to the scope of the prior art, and is not described in detail herein. According to an embodiment of the present disclosure, an value of a business object is described in XML, and it can also be described in other existing manners in the prior art.

Then, method 200 proceeds to step 206, in which, structure units of the SOA system are obtained. By analyzing the SOA system based on a predefined structure patterns, the SOA system can be broken down into multiple structure units, which can be, e.g., ESBs, gateways, or flows, etc. How to break down a SOA system into multiple structure units also belongs to the scope of the prior art, and is not described in detail herein. Through the deployed runtime proxies, values of the business objects in interactions among structure units of the SOA system as well as their relationships with structure units of the SOA system can be captured in the runtime environment (e.g., runtime environment 116) of the SOA system.

Next, method 200 proceeds to step 208, in which association relationships are established between structure units and values of business objects. According to an embodiment of the present disclosure, with respect of a structure unit, the association relationships may comprise: a value of a business object being an input of the structure unit; or a value of a business object being an output of the structure unit. According to an embodiment of the present disclosure, the association relationships may also comprise a corresponding relationship between a value of a business object as an input of a structure unit and a value of a business object as an output of the structure unit with respect to the structure unit. The essence of establishing association relationships is to establish mapping between values of business objects and structure units by using the values of the business objects and their relationships with the structure units of the SOA system obtained by the runtime proxies.

Then, method 200 proceeds to step 210, in which business rules are generated based on the association relationships. According to an embodiment of the present disclosure, the generating business rules based on the association relationships comprises: determining a condition of a business rule; determining an action of the business object; and linking the condition of the business rule and the action of the business rule based on an association relationship to generate the business rule. According to an embodiment of the present disclosure, a condition of a business rule can be determined by performing content comparison on values of multiple business objects as inputs of a structure unit. According to an embodiment of the present disclosure, an action of the business rule can be determined by performing content comparison on values of multiple business objects as outputs of a structure unit. According to an embodiment of the present disclosure, a condition of a business rule and/or an action of a business rule can be determined by performing content comparison on values of business objects as inputs of a structure unit and values of business objects as outputs of the same structure unit. The above implementations will be described briefly by way of specific examples.

Now it is first introduced that common business rules include business object content conversion rules, service selection rules and filtering rules. A business object content conversion rule refers to, for a structure unit, how a value of an input business object is converted into a value of an output business object in passing through the structure unit. A service selection rule refers to, for a structure unit, how a value of an input business object selects a subsequent service after passing through the structure unit. A filtering rule refers to, for a structure unit, what kind of values of business objects will be allowed to pass through it.

Next, a brief design will be given by taking a structure unit being an ESB as an example. Through using values of business objects and their relationships with the structure unit of the SOA system obtained by runtime proxies, association relationships between the values of the business objects and the ESB are established. Assume the established association relationships include: with respect of the ESB, there are values of six business objects as inputs of the ESB, denoted here as BOIV1, BOIV2, BOIV3, BOIV4, BOIV5, and BOIV6. There are values of three business objects as outputs of the business object, denoted here as BOOV1, BOOV2, and BOOV6. When BOIV1, BOIV2, and BOIV3 are input of the ESB, a subsequent service corresponding to BOOV1 is selected; when BOIV4 and BOIV5 are inputs of the ESB, a subsequent service corresponding to BOOV2 is selected; and when BOIV6 is the input of the ESB, the corresponding output is BOOV6. Based on the association relationships between the values of the business objects and the structure units, it can be known that there are several business rules as follows:

1) business rule 1—corresponding to that when BOIV1, BOIV2, and BOIV3 are the input, the subsequent service corresponding to BOOV1 is selected;

2) business rule 2—corresponding to that when BOIV4 and BOIV5 are the input, the subsequent service corresponding to BOOV2 is selected; and 3) business rule 3—corresponding to that when BOIV6 is the input, the output is BOOV6.

It can also be known that business rule 1 and 2 are service selection rules, and business rule 3 is a business object content conversion rule.

In the following, it will be described through examples how the business rules 1-3 are generated respectively. According to an embodiment of the present disclosure, the condition of business rule 1 can be determined by performing content comparison on BOIV1, BOIV2, and BOIV3. By performing content comparison on the XML trees to which BOIV1, BOIV2, and BOIV3 correspond, the same portion of BOIV1, BOIV2, and BOIV3 is determined. Since when BOIV1, BOIV2, and BOIV3 are inputs of the ESB, a subsequent service corresponding to BOOV1 is selected, it can be determined that the same portion of BOIV1, BOIV2, and BOIV3 is the condition, and the corresponding action is to select the subsequent service corresponding to BOOV1. Next, by linking the above condition and action, business rule 1 is obtained, that is, when values of business objects as inputs has the same portion of BOIV1, BOIV2, and BOIV3, the subsequent service corresponding to BOOV1 is selected, which can be expressed in the following expression:

$$BOIV1 \cap BOIV2 \cap BOIV3 => BOOV1$$

Similarly, by performing content comparison on the XML trees to which BOIV4 and BOIV5 correspond, the same portion of BOIV4 and BOIV5 can be determined, thereby obtaining business rule 2, which can be expressed in the following expression:

$$BOIV4 \cap BOIV5 => BOOV2$$

Similarly, a filtering rule can be generated by performing content comparison on values of multiple business objects that cannot pass through a structure unit to determine the same portion as the condition, and taking the corresponding result (i.e., these business objects cannot pass through the structure unit) as the action.

According to an embodiment of the present disclosure, the condition and action of business rule 3 can be determined by performing content comparison on BOIV6 and BOOV6. By performing content comparison on BOIV6 and BOOV6, the same portion of BOIV6 and BOOV6 can be obtained. Since the remaining portion of BOIV6 after removal of the same portion as BOOV6, when passing through the ESB, is converted into the remaining portion of BOOV6 after removal of the same portion as BOIV6, it can be known that the corresponding business object conversion rule can be expressed in the following expression:

$$BOIV6-(BOIV6 \cap BOOV6) => BOOV6-(BOIV6 \cap BOOV6)$$

How to perform content comparison in particular belongs to the scope of the prior art, and is not described in detail herein.

Further, according to an embodiment of the present disclosure, method 200 further comprises deleting redundant business rules. For business object content conversion rules, since for a same structure unit there may be multiple inputs and corresponding outputs, by performing content comparison on inputs and their corresponding outputs, conditions and corresponding actions of multiple business rules may be obtained. In this case there may be redundant business rules, and by deleting redundant business rules, the output may be simplified.

Further, according to an embodiment of the present disclosure, method 200 further comprises filtering the generated business rules based on the association relationships. For service selection rules, since for a structure unit there may be the case that its outputs are in a particular scope determined by an association relationship, some rules whose corresponding outputs exceed the particular scope determined by the association relationship may be filtered out, thus simplifying the output.

Figure 3:
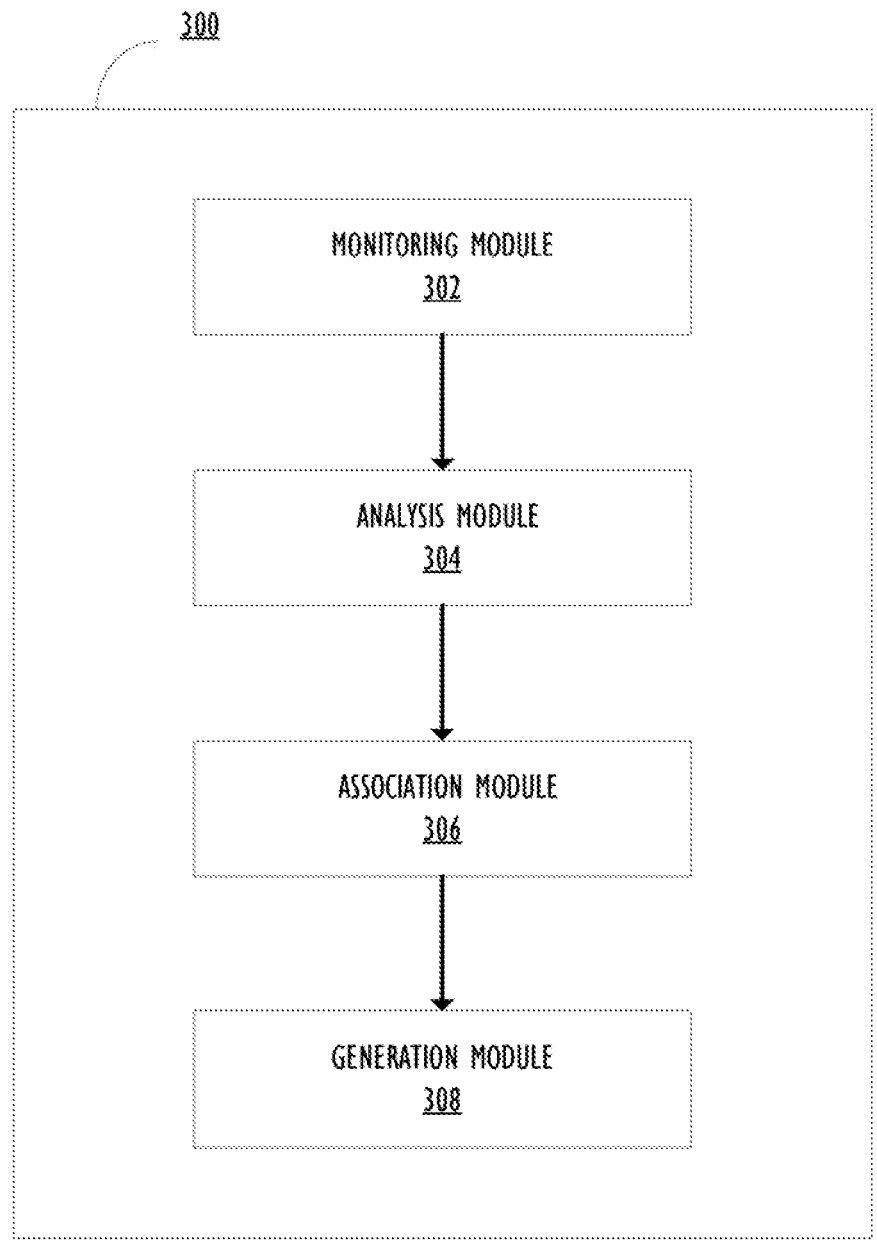
FIG. 3 illustrates a block diagram of a system for extracting business rules of a SOA system according to an embodiment of the present disclosure.

Referring to FIG. 3, there is illustrated a block diagram of system 300 for extracting business rules of a SOA system according to an embodiment of the present disclosure. According to an embodiment of the present disclosure, the system 300 for extracting business rules of a SOA system comprises: a monitoring module 302 configured to obtain values of a plurality of business objects; an analysis module 304 configured to obtain structure units of the SOA system; an association module 306 configured to establish association relationships between the structure units and the values of the business objects; and a generation module 308 configured to generate business rules based on the association relationships. According to an embodiment of the present disclosure, with respect of a structure unit, association relationships comprise: a value of a business object being an input of the structure unit; or a value of a business object being an output of the structure unit. According to an embodiment of the present disclosure, association relationships may further comprise: a corresponding relationship between a value of a business object as an input of a structure unit and a value of a business object as an output of the structure unit with respect of the structure unit.

According to an embodiment of the present disclosure, the generation module 308 is further configured to: determine a condition of a business rule; determine an action of the business rule; and link the condition of the business rule and the action of the business rule based on an association relationship to generate the business rule. According to an embodiment of the present disclosure, a condition of a business rule is determined by performing content comparison on values of multiple business objects as inputs of a structure unit. According to an embodiment of the present disclosure, an action of a business rule is determined by performing content comparison on values of multiple business objects as outputs of a structure unit. According to an embodiment of the present disclosure, a condition of a business rule and/or an action of the business rule are determined by performing content comparison on a value of a business object as an input of a structure unit and a value of a business object as an output of the same structure unit.

According to an embodiment of the present disclosure, the generation module 308 is further configured to: delete redundant business rules. According to an embodiment of the present disclosure, the system 300 further comprises a filtering module (not shown) configured to filter the generated business rules based on the association relationships.

In the flow charts above, one or more of the methods are embodied in a computer readable storage device containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the disclosure. Thus, while the method processes are described and illustrated in a particular sequence, use of a specific sequence of processes is not meant to imply any limitations. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

Thus, it is important that while an illustrative embodiment of the present disclosure is described in the context of a fully functional data processing system with installed (or executed) software, those skilled in the art will appreciate that the software aspects of an illustrative embodiment of the present disclosure are capable of being distributed as a program product in a variety of forms, and that an illustrative embodiment of the present disclosure applies equally regardless of the particular type of media used to actually carry out the distribution.

As will be appreciated by one skilled in the art, aspects of the present disclosure may be embodied as a system, method or computer program product. Accordingly, aspects of the present disclosure may take the form of an entirely hardware embodiment or an embodiment combining software (including, for example, firmware, resident software, micro-code, etc.) and hardware aspects that may all generally be referred to herein as a "circuit," "module" or "system." Furthermore, aspects of the present disclosure may take the form of a computer program product embodied in a computer readable storage device, computer usable device, and/or one or more computer readable medium(s) having computer readable program code embodied thereon.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage device that can direct a computer, other programmable data processing apparatus, or other devices to function in a particular manner, such that the instructions stored in the computer readable device produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It should be further pointed out that in the apparatus, computer readable storage device, and method of the present disclosure, the components or steps may be decomposed and/or recombined. The decomposition and/or recombination may be viewed as equivalent solutions of the present disclosure. Moreover, the steps executing the above series of processing may be naturally performed in time order according to the sequence of the description, but they may not necessarily be performed in time order. Some steps may be performed in parallel or independently of each other.

While the disclosure has been described with reference to exemplary embodiments, it will be understood by those skilled in the art that various changes may be made and equivalents may be substituted for elements thereof without departing from the scope of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure.

In addition, many modifications may be made to adapt a particular system, device or component thereof to the teachings of the disclosure without departing from the essential scope thereof. The embodiment was chosen and described in order to best explain the principles of the disclosure and the practical application, and to enable others of ordinary skill in the art to understand the disclosure for various embodiments with various modifications as are suited to the particular use contemplated. Therefore, it is intended that the disclosure not be limited to the particular embodiments disclosed for carrying out this disclosure, but that the disclosure will include all embodiments falling within the scope of the appended claims.

Although the present disclosure and advantages thereof have been described in detail, it will be understood that various changes, substitution and transformation may be made thereto without departing from the spirit and scope of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented method for extracting business rules of Service-Oriented Architecture (SOA) system, the method comprising:
    obtaining one or more values of a plurality of business objects;
    obtaining one or more structure units of the SOA system;
    establishing one or more association relationships between the one or more structure units and the one or more values of the plurality of business objects, wherein an association relationship comprises one of a value of a business object that is an input of the structure unit and a value of a business object that is an output of the structure unit and further comprises a corresponding relationship between a value of a business object as an input of the structure unit and a value of a business object as an output of the structure unit with respect of the structure unit; and
    generating one or more business rules based on the one or more association relationships by:
        determining a condition of each of the one or more business rules;
        determining an action of each of the one or more business rules; and
        linking the condition of each of the one or more business rules and the action of each of the one or more business rules based on at least one of the one or more association relationships to generate the business rule.

2. The method according to claim 1, wherein a condition of a business rule is determined by performing a content comparison on one or more values of multiple business objects as inputs of at least one of the one or more structure units.

3. The method according to claim 1, wherein at least one of a condition of a business rule and an action of the business rule are determined by performing a content comparison on one or more values of at least one business object of the plurality of business objects as an input of at least one of the one or more structure units and at least one value at least one business object of the plurality of business objects as an output of the same at least one of the one or more structure units.

4. The method according to claim 1, further comprising: deleting one or more redundant business rules.

5. The method according to claim 1, further comprising: filtering the generated one or more business rules based on the one or more association relationships.

6. The method according to claim 1, wherein a value of a business object is described in extended markup language (XML).

7. A system for extracting business rules of a Service-Oriented Architecture (SOA) system, the system comprising:
a processor;
a memory;
a monitoring module configured to obtain one or more values of a plurality of business objects;
an analysis module configured to obtain one or more structure units of the SOA system;
an association module configured to establish one or more association relationships between the one or more structure units and the one or more values of the plurality of business objects, wherein an association relationship comprises one of a value of a business object that is an input of the structure unit and a value of a business object that is an output of the structure unit and further comprises a corresponding relationship between a value of a business object as an input of the structure unit and a value of a business object as an output of the structure unit with respect of the structure unit; and
a generation module configured to generate one or more business rules based on the one or more association relationships and further configured to:
determine a condition of each of the one or more business rules;
determine an action of each of the one or more business rules; and
link the condition of each of the one or more business rules and the action of each of the one or more business rules based on at least one of the one or more association relationships to generate the business rule.

8. The system according to claim 7, wherein a condition of a business rule is determined by performing a content comparison on one or more values of multiple business objects as inputs of at least one of the one or more structure units.

9. The system according to claim 7, wherein at least one of a condition of a business rule and an action of the business rule are determined by performing a content comparison on one or more values of at least one business object of the plurality of business objects as an input of at least one of the one or more structure units and at least one value at least one business object of the plurality of business objects as an output of the same at least one of the one or more structure units.

10. The system according to claim 7, wherein the generation module is further configured to delete redundant business rules.

11. The system according to claim 7, further comprising a filtering module configured to filter the generated one or more business rules based on the one or more association relationships.

12. The system according to claim 7, wherein a value of a business object is described in extended markup language (XML).

13. A computer program product for extracting business rules of a Service-Oriented Architecture (SOA) system, the computer program product comprising a computer readable storage device having computer executable program code stored thereon for:
obtaining one or more values of a plurality of business objects, wherein a value of a business object is described in extended markup language (XML);
obtaining one or more structure units of the SOA system;
establishing one or more association relationships between the one or more structure units and the one or more values of the plurality of business objects, wherein an association relationship comprises one of a value of a business object that is an input of the structure unit and a value of a business object that is an output of the structure unit; and
generating one or more business rules based on the one or more association relationships, by:
determining a condition of each of the one or more business rules, wherein a condition of a business rule is determined by performing a content comparison on one or more values of multiple business objects as inputs of at least one of the one or more structure units;
determining an action of each of the one or more business rules; and
linking the condition of each of the one or more business rules and the action of each of the one or more business rules based on at least one of the one or more association relationships to generate the business rule.

14. The computer program product of claim 13, wherein:
the program code for generating the one or more business rules further comprises program code for deleting one or more redundant business rules; and
the program code further comprises program code for filtering the generated one or more business rules based on the one or more association relationships.

15. The computer program product of claim 13, wherein:
an association relationship further comprises a corresponding relationship between a value of a business object as an input of the structure unit and a value of a business object as an output of the structure unit with respect of the structure unit; and
at least one of a condition of a business rule and an action of the business rule are determined by performing a content comparison on one or more values of at least one business object of the plurality of business objects as an input of at least one of the one or more structure units and at least one value at least one business object of the plurality of business objects as an output of the same at least one of the one or more structure units.

* * * * *